US00RE45262E

(19) United States
(12) Reissued Patent
Wiener

(10) Patent Number: US RE45,262 E
(45) Date of Reissued Patent: Nov. 25, 2014

(54) VOICE-CONTROLLED NAVIGATION DEVICE UTILIZING WIRELESS DATA TRANSMISSION FOR OBTAINING MAPS AND REAL-TIME OVERLAY INFORMATION

(75) Inventor: Christopher R. Wiener, Morris Plains, NJ (US)

(73) Assignee: Intel Corporation, Santa Clara, CA (US)

(21) Appl. No.: 11/004,172

(22) Filed: Dec. 2, 2004

Related U.S. Patent Documents

Reissue of:

(64) Patent No.: 6,490,521
Issued: Dec. 3, 2002
Appl. No.: 09/749,634
Filed: Dec. 28, 2000

(51) Int. Cl.

| | |
|---|---|
| ***G01C 21/34*** | (2006.01) |
| ***G01C 21/36*** | (2006.01) |
| ***G10L 13/00*** | (2006.01) |
| ***G10L 15/26*** | (2006.01) |
| ***G10L 13/04*** | (2006.01) |
| ***G10L 15/00*** | (2006.01) |
| ***G10L 17/00*** | (2006.01) |

(52) U.S. Cl.

CPC ..... *G01C 21/3608* (2013.01); *G10L 15/265* (2013.01); *G10L 17/005* (2013.01); *G10L 13/043* (2013.01); *G01C 21/3629* (2013.01)

USPC ..... 701/443; 701/431; 701/467; 701/468; 342/357.43; 704/E13.008; 704/E15.045; 704/E17.003

(58) Field of Classification Search

None

See application file for complete search history.

(56) References Cited

U.S. PATENT DOCUMENTS

| | | | | | |
|---|---|---|---|---|---|
| 4,827,520 | A | * | 5/1989 | Zeinstra | 701/1 |
| 4,954,958 | A | * | 9/1990 | Savage et al. | 701/202 |
| 5,543,789 | A | * | 8/1996 | Behr et al. | 340/990 |
| 5,699,255 | A | * | 12/1997 | Ellis et al. | 701/212 |
| 5,893,898 | A | * | 4/1999 | Tanimoto | 701/201 |
| 5,944,769 | A | * | 8/1999 | Musk et al. | 701/201 |
| 5,948,040 | A | * | 9/1999 | DeLorme et al. | 340/990 |
| 5,969,673 | A | * | 10/1999 | Bickley et al. | 342/357.09 |
| 6,028,537 | A | * | 2/2000 | Suman et al. | 340/426 |
| 6,064,323 | A | * | 5/2000 | Ishii et al. | 340/990 |

(Continued)

FOREIGN PATENT DOCUMENTS

WO WO 00/40038 * 7/2000

OTHER PUBLICATIONS

"Clarion Launches Vetronix Corporation's Carport(™) for the AutoPCT(™)"; Clarion AutoPC:Press Releases, Dec. 29, 1999;□□ pp. 1-3.*

*Primary Examiner* — Michael J Zanelli

(74) *Attorney, Agent, or Firm* — Blakely, Sokoloff, Taylor & Zafman LLP

(57) ABSTRACT

A navigation system and method involving wireless communications technology and speech processing technology is presented. In accordance with an embodiment of the invention, the navigation system includes a subscriber unit communicating with a service provider. The subscriber unit includes a global positioning system mechanism to determine subscriber position information and a speech processing mechanism to receive destination information spoken by a subscriber. The subscriber unit transmits the subscriber position and destination information to the service provider, which gathers navigation information, including a map and a route from the subscriber position to the specified destination. The service provider transmits the navigation information to the subscriber unit. The subscriber unit conveys the received navigation information to the subscriber via an output mechanism, such as a speech synthesis unit or a graphical display.

17 Claims, 6 Drawing Sheets

100

(56) References Cited

U.S. PATENT DOCUMENTS

| | | | | |
|---|---|---|---|---|
| 6,115,611 | A | 9/2000 | Kimoto et al. | |
| 6,115,667 | A | 9/2000 | Nakamura | |
| 6,148,261 | A * | 11/2000 | Obradovich et al. | 340/286.01 |
| 6,169,955 | B1 | 1/2001 | Fultz | |
| 6,230,132 | B1 * | 5/2001 | Class et al. | 704/270 |
| 6,266,615 | B1 * | 7/2001 | Jin | 701/213 |
| 6,304,816 | B1 * | 10/2001 | Berstis | 701/117 |
| 6,314,365 | B1 * | 11/2001 | Smith | 340/988 |
| 6,317,684 | B1 | 11/2001 | Roeseler et al. | |
| 6,462,676 | B1 * | 10/2002 | Koizumi | 340/995.1 |
| 6,487,495 | B1 * | 11/2002 | Gale et al. | 701/209 |
| 6,526,335 | B1 * | 2/2003 | Treyz et al. | 701/1 |
| 6,680,694 | B1 * | 1/2004 | Knockeart et al. | 342/357.09 |
| 6,754,485 | B1 * | 6/2004 | Obradovich et al. | 455/414.1 |
| 7,039,629 | B1 * | 5/2006 | Theimer et al. | 707/3 |

* cited by examiner

VOICE-CONTROLLED NAVIGATION DEVICE UTILIZING WIRELESS DATA TRANSMISSION FOR OBTAINING MAPS AND REAL-TIME OVERLAY INFORMATION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to navigation systems. Specifically, this invention relates to a novel system and method that promotes safety in, and enhances the utility of, navigation systems.

2. Description of Related Art and General Background

Navigation systems assist users in finding their way from one location to another. In some systems, a user inputs a starting location and an intended destination, and the system, typically via algorithms acting on map databases, generates a sequence of directions that the user may follow to successfully reach the destination. These directions comprise one or more waypoints, which are points along the prescribed route that may bear significance to the route. For instance, if the directions prescribe that the user should turn right at the intersection of X and Y Streets, then that intersection may be a waypoint. In such systems, a user traversing the route must carefully follow the directions. Indeed, if the user veers off the route, the user easily may become lost; in unfamiliar surroundings, it is often difficult to return to the prescribed route.

More advanced systems employ Global Positioning System (GPS) technology to supply a user in close vicinity of the navigation device with real-time information about the user's geographic location. A GPS-equipped device receives signals transmitted by twenty-four NAVSTAR GPS satellites orbiting the earth, triangulates these signals, and computes the location of the device in terms of coordinates. Because the coordinates are themselves of little significance to most users, GPS systems may provide a visual representation of a user's location, represented by a cursor overlaid on a map of the region in which the user is presently located.

Hybrid systems combine the functionality of the above-described systems. A user inputs a desired destination, a GPS receiver in the navigation device computes the current location of the device, software determines a route for the user, and the device outputs a set of directions for the user to follow. A map of the surroundings encompassing the route may be shown on a video display, as may the current location of the device. The current location may be represented by a cursor overlaid on the map. Additionally, the prescribed route may be superimposed on the map. Both the map and cursor may be dynamically updated as the user traverses the route. Nevertheless, if the user fails to constantly monitor the position of the cursor on the map, the user may not realize that he has deviated from the prescribed route. When this discovery is made, significant travel time may have been lost, and a less advantageous route may be the only alternative.

When users travel across great distances or vacation in obscure locales, navigation devices must display maps associated therewith. Accordingly, large data sets are needed. Most conventional navigation systems have relied on mass-storage means, such as CD-ROMs, to fulfill this need, but many region-specific CD-ROMs must be purchased at great expense. The map information contained within the CD-ROMs may become outdated with the construction of new thoroughfares. In addition, the map information may become unreliable when, for instance, temporary road construction, traffic conditions, or natural disasters render legs of a route inaccessible or otherwise undesirable. Various solutions have been proposed, including acquiring map data from remote locations via radio transmission or similar means. Unfortunately, these proposals fail to sufficiently limit the character, quantity, and frequency of transmissions from the remote location to the user's location and back.

More fundamentally, these proposals are lacking in their failure to sufficiently protect the well-being of the user. In particular, when a user inadvertently deviates from a prescribed route, the user may be inconvenienced by travel delays. Further, at night, the likelihood of having an accident may increase if the user has ventured onto secondary roads in need of repair or roads in which lighting is inadequate.

Moreover, the problem of the misguided traveler exists alongside an even more pervasive one: the problem of the distracted traveler. For example, when the GPS device resides in a car, a driver who is lost may have to physically input new commands, such as a request to generate a new route from the current position to the original destination. By physically operating the device when driving, the driver may become distracted, making such operations potentially dangerous.

Furthermore, it is desirable that those in the public-at-large, including persons with disabilities, are able to fully avail themselves of the functionality of a navigation system.

Therefore, what is needed is a system and method that promotes safety in, and enhances the utility of, navigation systems.

DETAILED DESCRIPTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather, the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein.

Moreover, the processes associated with the presented embodiments may be stored in any storage device, such as, for example, a computer system (non-volatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

A navigation system, as described herein, includes a subscriber unit configured to receive and transmit navigation information, as well as other service-related information. The subscriber unit incorporates a speech processing mechanism to accommodate communications between the subscriber unit and a subscriber, and global positioning technology to determine the subscriber's current position. A service provider communicates with the subscriber unit, and is configured to receive and transmit information. As such, the subscriber unit and service provider exchange information. The service provider may provide the subscriber with real-time map and routing information, and may alert and reroute the subscriber if the subscriber becomes lost.

Figure 1:
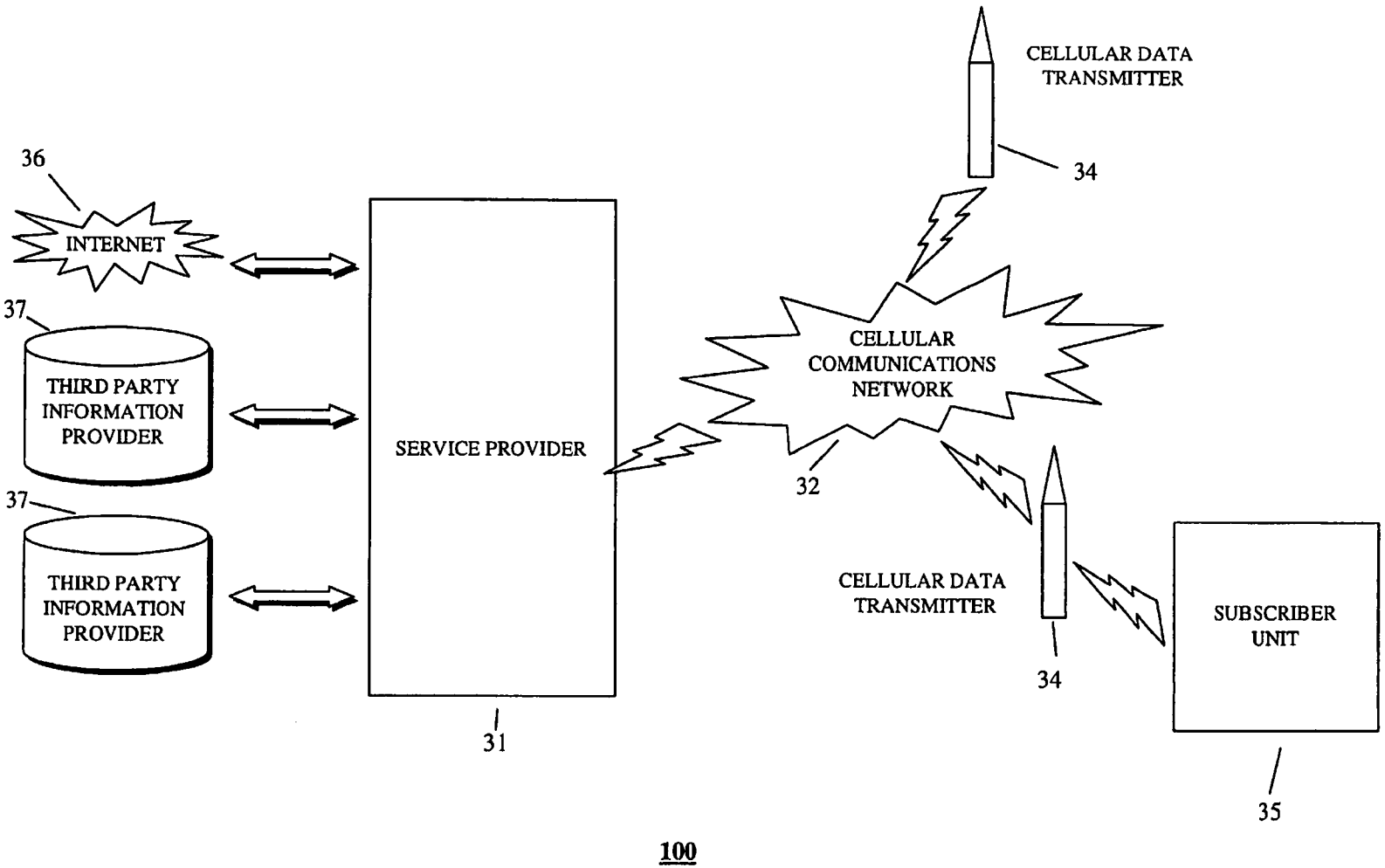
FIG. 1 depicts a high-level diagram of a navigation system in accordance with an embodiment of the present invention.

FIG. 1 is a high-level representation of navigation system 100 in accordance with an embodiment of the present invention. As shown, navigation system 100 comprises subscriber unit 35, service provider 31, cellular communications network 32, and various cellular data transmitters 34. Subscriber unit 35 is the navigation device of navigation system 100, and is operated by a subscriber in need of navigating to a desired destination. Subscriber unit 35 transmits the subscriber's current position and desired destination to service provider 31, and requests that service provider 31 provide a map and directions to assist the subscriber in navigating from the current position to the desired destination. Service provider 31 performs information gathering and processing functions, as well as transmits real-time navigation information to subscriber unit 35. In the embodiment of FIG. 1, communication between subscriber unit 35 and service provider 31 is effectuated by cellular communications network 32 and its subsidiary cellular data transmitter sites 34. It is to be appreciated that other modes of communication may link subscriber unit 35 and service provider 31, such as radio broadcast transmissions.

In an exemplary implementation, service provider 31 has a direct connection to a data communications network, such as, for example, the Internet 36, and a connection to various third-party information providers 37. Thus, service provider 31 may access a host of information, processing such information and transmitting it to subscriber unit 35.

It may be desirable for a subscriber of navigation system 100 to enter into an account relationship with service provider 31. Accordingly, a subscriber may open an account with service provider 31, and provide information to service provider 31 that identifies the subscriber as distinct from other subscribers. In addition, service provider 31 may precisely tailor the services it offers to the subscriber. In an exemplary embodiment, each subscriber is designated with a user identifier that subscriber unit 35 embeds in each data packet transmitted to service provider 31.

Figure 2:
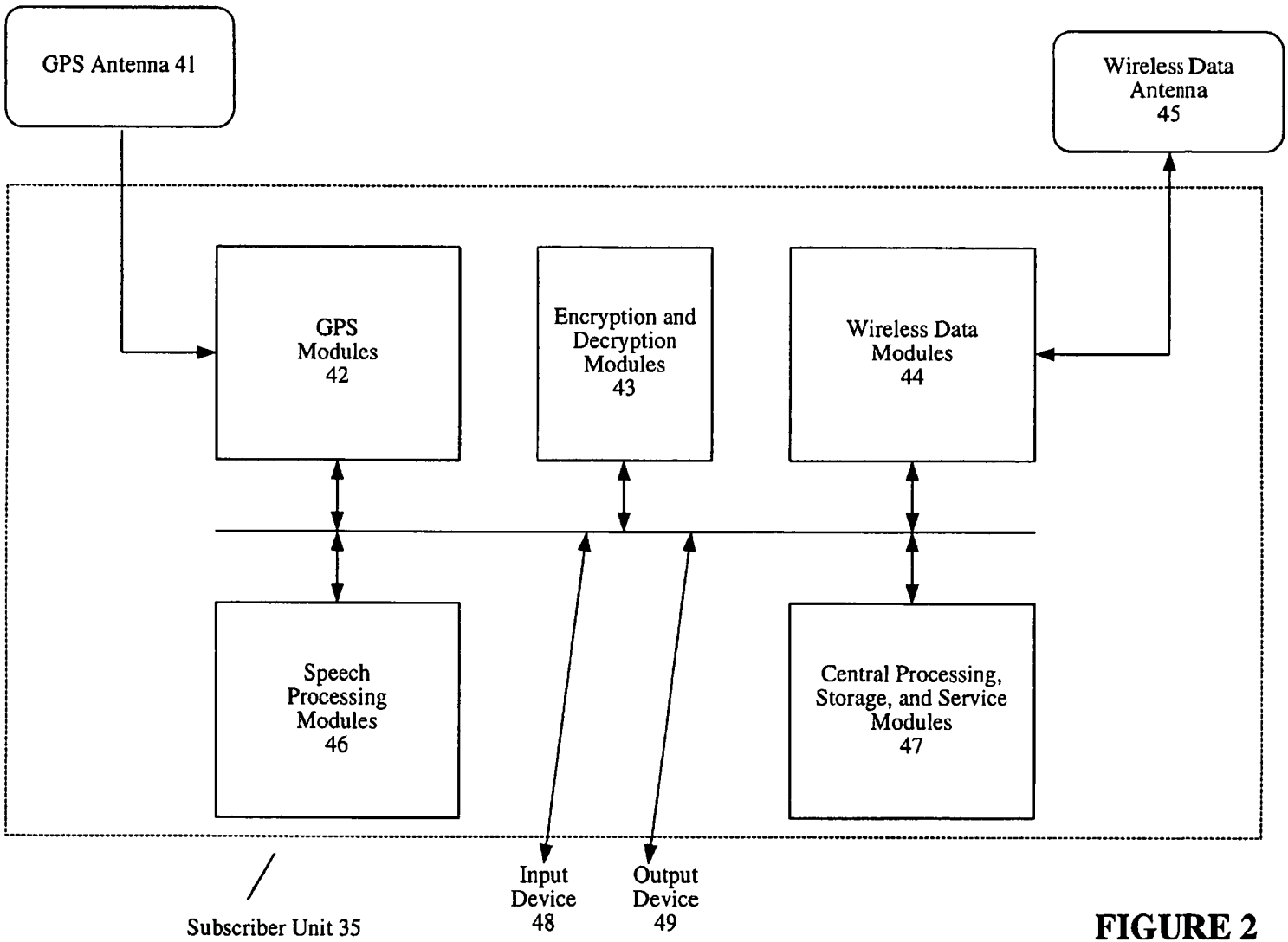
FIG. 2 depicts a functional block diagram of a subscriber unit in accordance with an embodiment of the present invention.

FIG. 2 is a functional block diagram depicting subscriber unit 35. Subscriber unit 35 may be designed for installation in a vehicle such as a car or helicopter, receiving power from the vehicle's electrical system. In some embodiments, subscriber unit 35 may be packaged in a compact form such that a person traveling by foot, for example, a hiker or a tourist in a city, may carry the device, which may be outfitted with a rechargeable power supply. In other embodiments, subscriber unit 35 may be mounted on a wheelchair or similar personal transportation device, such as a bicycle or golf cart, whereby the operator may navigate to an intended destination. Subscriber unit 35 may also be incorporated into a communications device, such as, for example, a cellular phone.

As shown, subscriber unit 35 comprises GPS antenna 41, GPS modules 42, encryption and decryption modules 43, wireless data antenna 45, wireless data modules 44, speech processing modules 46, and central processing, storage, and service modules 47. Input device 48 and output device 49 may be integrated into various modules of subscriber unit 35, or may be provided in navigation system 100 as peripheral devices.

In particular, GPS antenna 41 and GPS modules 42 constantly acquire the coordinates of a subscriber's current position on earth. Wireless data antenna 45 and wireless data modules 44 transmit data to, and receive data from, service provider 31 over the cellular communications network 32. Encryption and decryption modules 43 encrypt and decrypt information exchanged between subscriber unit 35 and service provider 31 to safeguard the subscriber's privacy. Speech processing modules 46 receive and process verbal requests conveyed by the subscriber, such as a request to navigate to a specified destination. After subscriber unit 35 transmits the subscriber's request to service provider 31, service provider 31 gathers map information that the subscriber needs in order to navigate from a current position to the specified destination, and transmits that information to subscriber unit 35. Central processing, storage, and service modules 47 process the received map information, which may be outputted via speech processing modules 46 in the form of speech and via output device 49 in the form of graphics and text.

Figure 3:
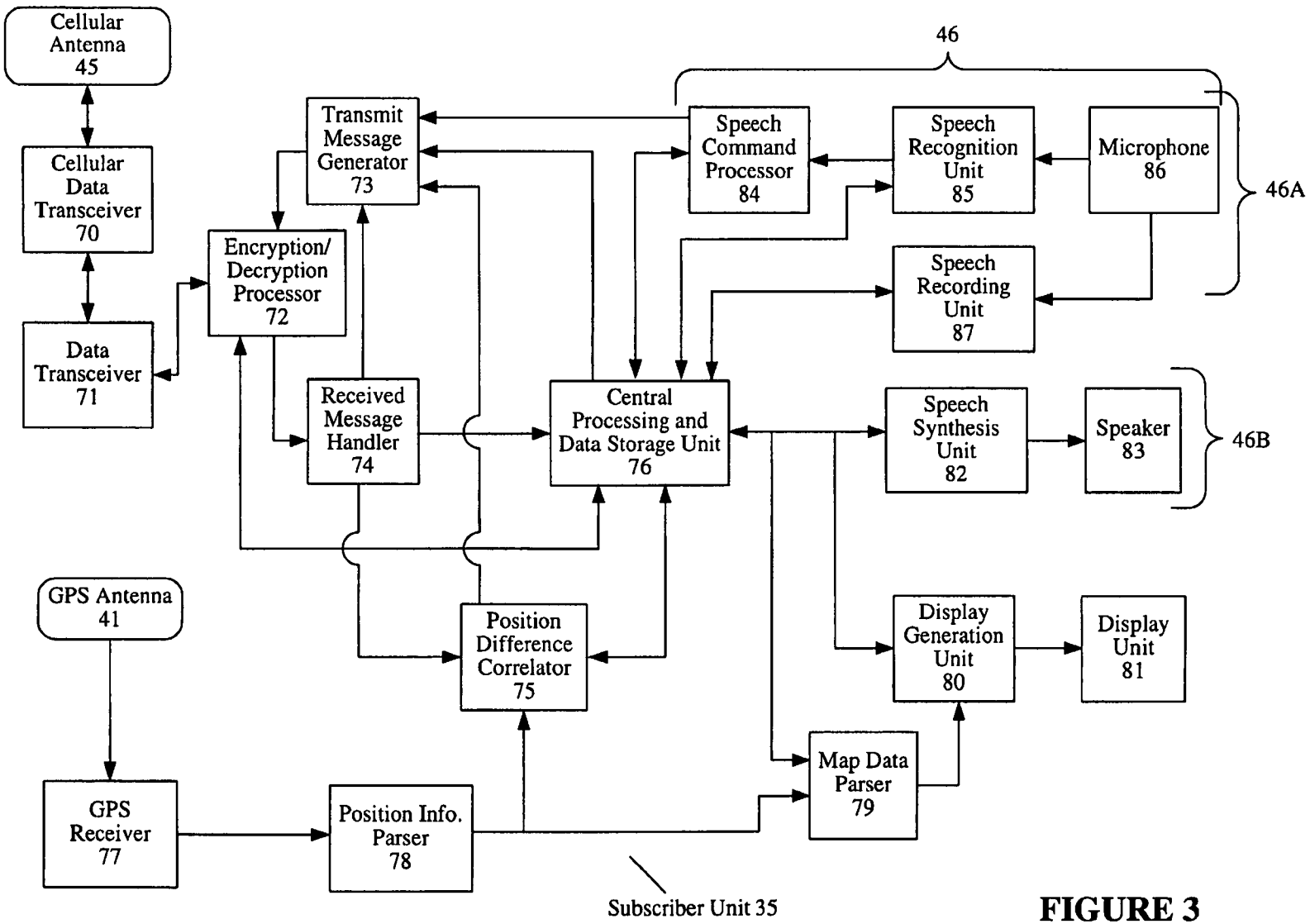
FIG. 3 illustrates the architecture of a subscriber unit, constructed and operative in accordance with an embodiment of the present invention.

FIG. 3 illustrates an exemplary implementation of subscriber unit 35. As shown, subscriber unit 35 includes a number of modules that interact to perform the requisite navigation functions. These modules are grouped into functional blocks that correspond to those shown in FIG. 2. These modules may be incorporated in a single chipset, or in separate devices that are interconnected. Software or hardware implementations of various modules may be adopted at the option of those skilled in the art.

Cellular antenna 45 and cellular data transceiver 70 receive data from, and transmit signals to, service provider 31. During reception, cellular data transceiver 70 supplies the data signals to data transceiver 71, which converts the data signals into a data format suitable for processing by subscriber unit 35. During transmission, data transceiver 71 modulates the data into data signals suitable for transmitting across a cellular communications network 32.

Encryption/decryption processor 72 decrypts data received from service provider 31, as well as encrypts data before subscriber unit 35 transmits it to service provider 31.

Transmit message generator 73 processes messages to be communicated to service provider 31. In an exemplary implementation, transmit message generator 73 processes (1) messages containing service requests for new map information, whereby a subscriber can continue to navigate in a new locale; (2) position update messages, whereby subscriber unit 35 updates service provider 31 with the current position of subscriber unit 35; (3) message receive acknowledgements, whereby subscriber unit 35 confirms with service provider 31 that subscriber unit 35 has received messages sent by service provider 31; (4) retransmit requests, whereby subscriber unit 35 requests service provider 31 to retransmit data; and (5) messages indicating subscriber unit 35 has been activated or deactivated. Each message processed by transmit generator 73 contains the subscriber's user identifier.

Received message handler 74 processes decrypted messages received from service provider 31 and dispatches them to appropriate service modules in subscriber unit 35. Received message handler 74 detects when a message has been received by subscriber unit 35 and validates such message. If the message is invalid, received message handler 74 initiates a retransmit request and supplies the request to transmit message generator 73 in order to generate a retransmit request to service provider 31.

As indicated in FIG. 3, subscriber unit 35 is also equipped with a GPS antenna 41 and GPS receiver 77, which constantly receive current position information from GPS satellites orbiting the earth. Such position information may be formatted, for example, as a NMEA 0183 data stream. Position information parser 78 parses the data stream outputted by GPS receiver 77, extracting current position information and converting it in accordance with the data format of subscriber unit 35.

Position difference correlator 75 receives inputs from received message handler 74, from central processing and data storage unit 76, and from position information parser 78. In order to minimize the quantity of cellular data transmissions in navigation system 100, subscriber unit 35 need not constantly update service provider 31 with the current position of subscriber unit 35. Instead, service provider 31 may store a current position of subscriber unit 35, and subscriber unit 35 may also store the current position in nonvolatile memory. Position difference correlator 75 compares the actual current position of subscriber unit 35, as provided by GPS receiver 77 and position information parser 78, with the current position stored in service provider 31. When the difference between the actual current position and the current position stored in service provider 31 exceeds a threshold value, subscriber unit 35 transmits a position update message to service provider 31 containing the actual current position of subscriber unit 35.

Position difference correlator 75 also compares the actual current position of subscriber unit 35, as provided by GPS receiver 77 and position information parser 78, with a position related to one or more points along a route that a subscriber is traversing. In one embodiment, position. difference correlator determines. the perpendicular. distance between the actual current position and a line connecting a previous waypoint and the next waypoint of the route. When the distance exceeds a predetermined value, signifying that a subscriber has likely inadvertently strayed from the route, position difference correlator 75, transmit message generator 73, and central processing and data storage unit 76 may act in concert to take appropriate action, including notifying the subscriber or transmitting a request to service provider 31 to devise an alternative route for the subscriber to traverse.

In another embodiment, a route is divided into a series of segments, each of which includes a starting and an ending position lying on the route. For curved roads, the segments may comprise short distances. For a given segment of the route, after the subscriber begins to traverse the segment, position difference correlator 75 may determine the distance between the actual current position of the subscriber and the segment. When the distance exceeds a predetermined value, the system may respond as described above. It is to be understood that if service provider 31 maintains a sufficiently current record of the position of subscriber unit 35, service provider 31 may also monitor whether the subscriber has strayed from the prescribed route.

Central processing and data storage unit 76 stores current position information in nonvolatile memory, commands that have been sent to service provider 31, current map information, and encryption keys. As such, subscriber unit 35 always has a resident copy of map information corresponding to the geographic region in which subscriber unit 35 is currently located, and may retransmit commands to service provider 31 if an error occurred during transmission. Central processing and data storage unit 76 also controls, monitors, and interfaces with transmit message generator 73, encryption/decryption processor 72, position difference correlator 75, map data parser 79, display generation unit 80, speech synthesis unit 82, and speech command processor 84.

Map information received from service provider 31 and routed by central processing and data storage unit 76 to map data parser 79 may be represented in terms of geographical coordinates, and comprises specific coordinate locations corresponding to waypoints along a prescribed route. Map data parser 79 converts this map information so that display generation unit 80 can process the converted information, producing a visual representation of a map depicting the waypoints along the prescribed route. Display generation unit 80 also receives from map data parser 79 the current position of subscriber unit 35, as provided by position information parser 78. As such, display generation unit 80 overlays the current position of subscriber unit 35 on the visual representation of the map. In other embodiments, destination information, traffic information, and weather information may be superimposed on the map.

Display generation unit 80 drives display unit 81, which is an output device in navigation system 100. In a car, display unit 81 may comprise a windshield heads-up display or dashboard-mounted LCD. In other embodiments of subscriber unit 35, a compact LCD display may be integrated into a handheld assembly. Instead of displaying a map, display generation unit 80 may display in textual form a list of the instructions that a subscriber should follow along a route to an intended destination.

As shown in FIG. 3, subscriber unit 35 also includes speech processing portion 46. Speech processing portion 46 comprises a speech processing input portion 46A and a speech processing output portion 46B.

Speech processing input portion 46A comprises microphone 86, speech recognition unit 85, and speech command processor 84. Microphone 86 is the interface between subscriber unit 35 and the spoken words of a subscriber. A subscriber speaks system commands into microphone 86, and speech recognition unit 85 processes the commands. Speech recognition unit 85 recognizes individual speech elements, known in the art as phonemes or primitives. Speech command processor 84 assembles primitives received from speech recognition unit 85 into system commands that central processing and data storage unit 76 may act upon. For example, a subscriber may speak the words, "Route me from here to 111 N. Elm Street." Speech recognition unit 85 processes the primitives, and speech command processor 84 assembles the primitives such that subscriber unit 35 transmits current position information, destination information, and a request for corresponding navigation information to service provider 31.

If different sets of speech primitives are stored in a nonvolatile memory that may be accessed by speech synthesis unit 82 and speech recognition unit 85, subscriber unit 35 may support the recognition and synthesis of various languages. In such an embodiment, a subscriber may specify his native language. Subsequent interaction between the subscriber and subscriber unit 35 may proceed in this language. Because their patrons may be foreigners, car rental companies may derive special benefits from this embodiment.

In other embodiments, a particular subscriber may train speech command processor 84 and speech recognition unit 85 to more accurately recognize the subscriber's speech. A training program may be run when a new subscriber uses subscriber unit 35 for the first time, or at an arbitrary time when the subscriber has sufficient time to provide a sampling of the subscriber's speech.

Speech processing output portion 46B comprises speech synthesis unit 82 and speaker 83. Speech synthesis unit 82 processes output messages from central processing and data storage unit 76 and synthesizes these output messages into recognizable speech patterns. These speech patterns are then outputted via speaker 83 in order to enable the subscriber in the vicinity of subscriber unit 35 to hear the output message. For example, speech synthesis unit may, by virtue of speaker 83, generate the phrase: "You are off course. Please say 'reroute' and we will reroute you." In some embodiments, speech synthesis unit 82 may have a fixed vocabulary, but the vocabulary may be upgraded through periodic system updates. Upgrading of subscriber unit 35 could be accomplished by implementing EEPROM technology, such as, for example, flash memory and ferroelectric RAM devices.

Figure 4:
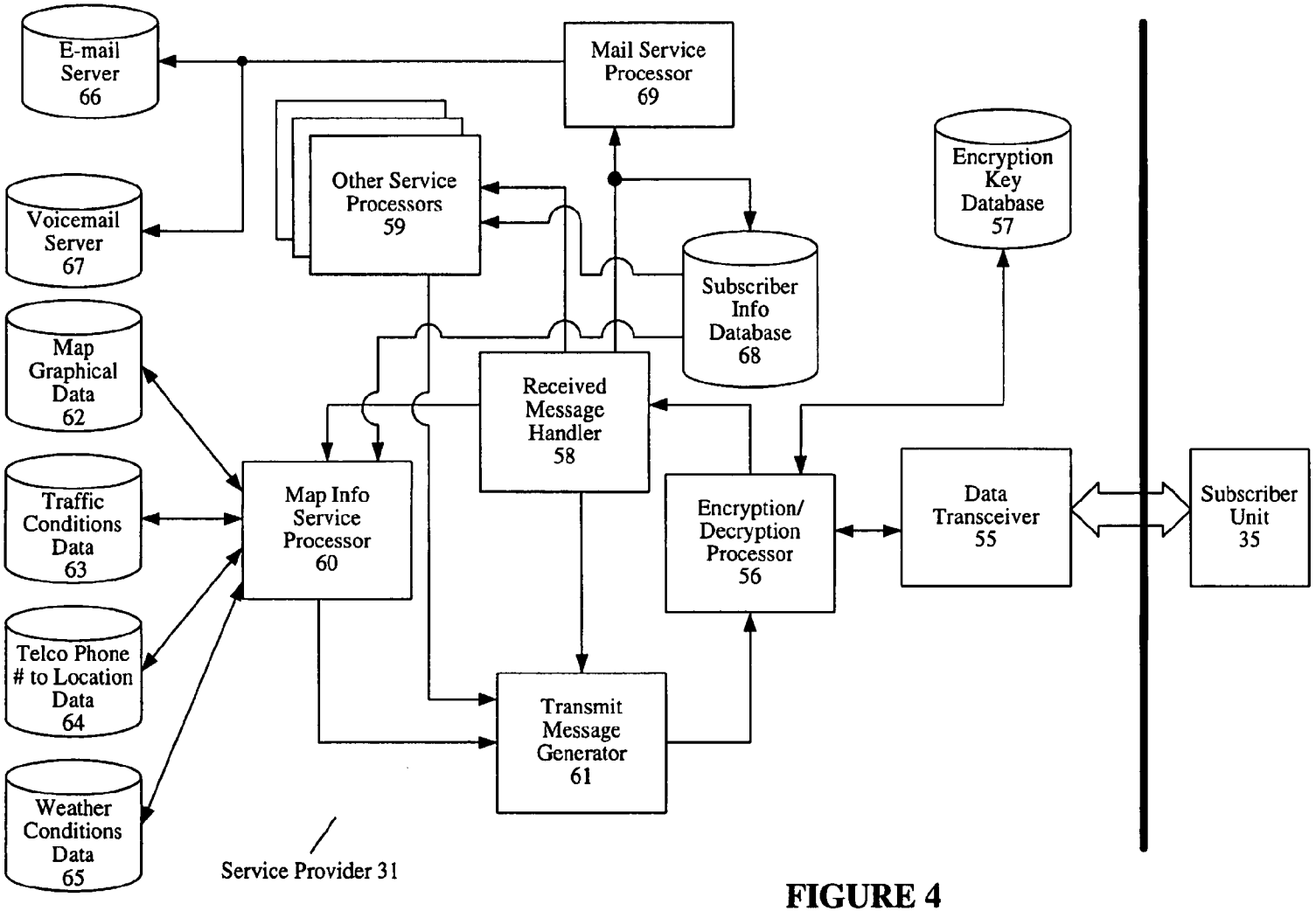
FIG. 4 illustrates the architecture of a service provider, constructed and operative in accordance with an embodiment of the present invention.

FIG. 4 depicts the architecture of service provider 31. Data transceiver 55 transmits and receives data in accordance with well known cellular communications technologies. Interfaced with data transceiver 55 is encryption/decryption processor 56, which encrypts data before it is transmitted by data transceiver 55 to subscriber unit 35, and decrypts data that is received from subscriber unit 35. Encryption key database 57 stores encryption keys associated with various subscribers. It is to be noted that encryption key database 57 can reside in a remote location as well as within service provider 31. Service provider 31 may store the current position of each subscriber unit 35 in a nonvolatile memory either locally or remotely.

Received message handler 58 processes messages received from subscriber unit 35 and validates their contents. If a message is valid, received message handler 58 routes the message to the appropriate service processor, including other service processors 59 and map information service processor 60. Transmit message generator 61 transmits a received data acknowledgement parameter, whereby service provider 31 informs subscriber unit 35 that service provider 31 has successfully received data transmitted by subscriber unit 35. If a message is invalid—for instance, the message is corrupted—received message handler 58 issues a retransmit request, which transmit message generator 61 sends to subscriber unit 35. In the embodiment shown in FIG. 4, the retransmit request would be encrypted before transmission by encryption/decryption processor 56.

When a valid message requesting navigation information is received by service provider 31, map information service processor 60 processes the request. For example, if the subscriber has specified a destination to which the user wishes to navigate, map information service processor 60 gathers appropriate map data 62, including graphical data. and routing data, and transmit message generator 61 transmits the gathered data to subscriber unit 35 with the aid of encryption/decryption processor 56 and data transceiver 55.

Map information service processor 60 may also monitor traffic conditions data 63 and weather conditions data 65 that are relevant to a given subscriber traversing a route and may take appropriate action if necessary, such as rerouting the subscriber to avoid a stretch of highway under construction or warning the subscriber to seek cover to avoid approaching severe weather. A subscriber may specify the telephone number of an intended destination instead of an address. As such, map information service processor 60 accesses location/number database 64 to find the address associated with the telephone number.

Encryption in navigation system 100 may employ well known symmetric or asymmetric cryptographic methodologies. In the case of asymmetric methodologies, public and private keys may be generated the first time that a particular subscriber activates subscriber unit 35. In some embodiments, such activation may occur at an activation facility, wherein an input/output port of subscriber unit 35 (not shown) receives configuration data from a configuration device connected to the input/output port of subscriber unit 35. During activation, service provider 31 may receive subscriber-specific information inputted by the subscriber and transmitted by subscriber unit 35, including subscriber name, address, telephone number, billing information, e-mail address, name of e-mail server, and userID and password for the e-mail server. It is to be appreciated that e-mail information need not be provided in certain embodiments.

Service provider 31 then generates a user identifier and a set of public and private keys that are unique to the subscriber. The subscriber's public key is stored in encryption key database 57 in service provider 31. The subscriber's private key is programmed into a secure, nonvolatile memory in subscriber unit 35, as is the public key of service provider 31. Speech recognition unit 85 of subscriber unit 35 may optionally be configured to recognize the identity of a particular subscriber based on the subscriber's speech pattern and to associate the speech pattern with the subscriber's private encryption key. If multiple subscribers use a particular subscriber unit 35, additional sets of keys may be generated and stored for each subscriber.

After the key sets are generated and stored, subscriber unit 35 and service provider 31 each encrypt data before transmission using the counterpart's public key. Under normal operating conditions, a subscriber activates subscriber unit 35, and speaks a predetermined word or phrase into microphone 86. The identity of the subscriber is determined by means of speech recognition unit 85, speech command processor 84, and central processing and data storage unit 76. Subscriber unit 35 then transmits a message to service provider 31 containing the subscriber's user identifier and indicating that subscriber unit 35 has been activated. Service provider 31 then accesses encryption key database 57 to locate the public key associated with the user identifier, and transmits a message in plaintext acknowledging the initial message of subscriber unit 35 and providing subscriber unit 35 with the public key of service provider 31. After this handshaking procedure is complete, all subsequent messages transmitted by either service provider 31 or subscriber unit 35 are encrypted using the other party's public key and decrypted by the recipient using the recipient's private key.

In other embodiments, navigation system 100 may accommodate other services, such as, for example, e-mail access, World Wide Web (WWW) surfing, voicemail access, and emergency roadside assistance. For example, to access e-mail, a subscriber may speak a command such as "e-mail" into microphone 86. Various modules of subscriber unit 35 described above process the spoken command and translate it into a specific message containing the subscriber's user identifier and a request to access e-mail. Mail service processor 69 (see FIG. 4) of service provider 31 uses the user identifier as a search key in subscriber information database 68, retrieves the subscriber's e-mail address; the subscriber's e-mail service provider login information; and the system name/network address of the subscriber's e-mail service provider.

If e-mail server 66 of service provider 31 is not the subscriber's e-mail service provider, e-mail server 66 may act as a proxy, and connect and log into a third party e-mail server that the subscriber had previously designated (not shown). If e-mail server 66 is that of the subscriber, the subscriber is logged in locally. Mail service processor 69 then scans the subscriber's inbox, returning the number of read and unread messages to subscriber unit 35. The subscriber then retrieves messages via voice commands or other input devices, and views them on the display device 81. Speech synthesis unit 82 may optionally read the e-mail messages to the subscriber.

Voicemail access may be effectuated in a manner similar to e-mail access, with voicemail server 67 acting as either the subscriber's voicemail server or a proxy to another such server. As shown in FIG. 3, speech processing input portion 46A of subscriber unit 35 may include a speech recording unit 87. The subscriber speaks into microphone 86, and speech recording unit 87 records the subscriber's words so that an outgoing message may be forwarded to voicemail server 67.

A subscriber communicating with service provider 31 may also surf the World Wide Web (WWW). For example, to access the WWW, a subscriber may speak a command such as "web" or "surf" into microphone 86. Subscriber unit 35 then prompts the subscriber to speak the URL of the page to be retrieved. The above-described modules of subscriber unit 35 assemble the URL, which subscriber unit 35 sends to service provider 31 for processing via the Web service processor (not shown). The Web service processor sends the URL to the web page cache (not shown), which, acting as a proxy device, forwards the URL to the Internet. The web page cache then receives the web page from the Internet and transmits it to subscriber unit 35. Subscriber unit 35 displays the web page on display unit 81, and optionally plays speech in accordance with specific embedded speech tags. For instance, a web page may contain a tag that reads "Welcome to yahoo.com." Web surfing may be performed by the subscriber via voice control or other input devices, such as a touch-sensitive screen, a keypad, or keyboard.

To summon emergency roadside assistance, a subscriber may speak a command such as "emergency" or "road service" into microphone 86. Subscriber unit 35 then prompts the subscriber to specify what type of assistance. is required, such as police, ambulance, or towing. A service request with appropriate parameters, including the subscriber's user identifier and current position, is transmitted to service provider 31. Service provider 31 may transmit a message back to subscriber unit 35 to confirm that the request is valid. The subscriber validates the request, and subscriber unit 35 returns this validation to service provider 31. Upon receiving the validation, service provider 31 alerts the appropriate authorities, providing all necessary information, including the subscriber's identity and current position. Finally, service provider 31 transmits a message to the subscriber confirming that help is on the way.

In another embodiment, subscriber unit 35 may include a two-layer software hierarchy that may be upgraded via cellular communications network 32. The first layer may be firmware that controls low-level operations of subscriber unit 35. The second layer may be application software associated with service provider 31 or other such service providers. An application programmatic interface (API) between the firmware and application software layers may be made available to the public by the manufacturer of subscriber unit 35. As such, various service providers may write application software to run on subscriber unit 35.

When subscriber unit 35 is manufactured, private keys for firmware and software may be stored in a nonvolatile memory of subscriber unit 35. Service provider 31 stores the associated public keys. Service provider 31 may transmit a message to subscriber unit 35 when a firmware or software upgrade is available. Service provider 31 may use the public key for firmware to digitally sign firmware upgrades, and the public key for software to digitally sign software upgrades. Upgrades may then be transmitted to subscriber unit 35 in encrypted form via cellular communications network 32, as described above. After decryption, subscriber unit 35 may authenticate the received upgrades using the private key for firmware, or the private key for software, as appropriate.

Figure 5:
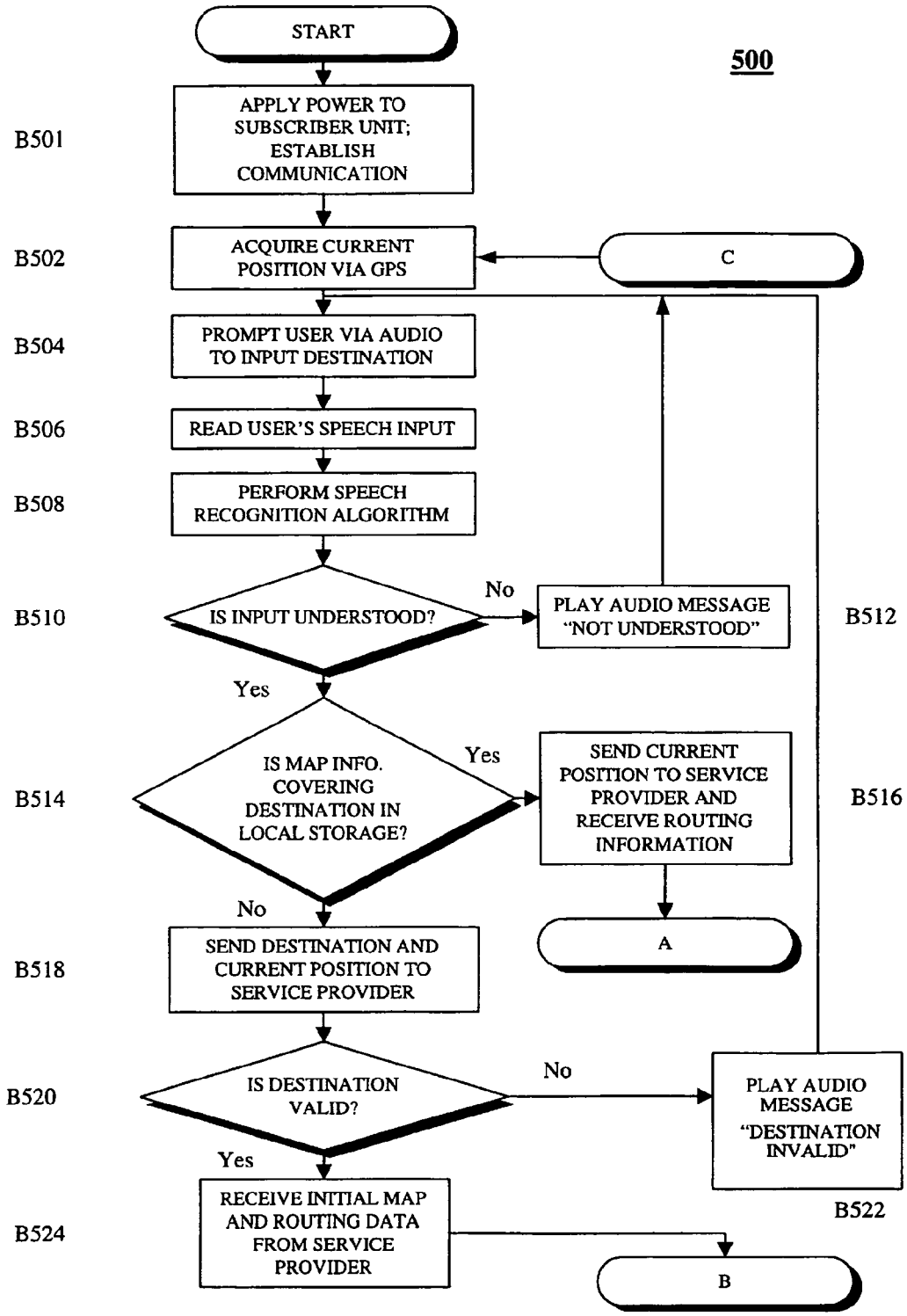
FIGS. 5 and 6 are high-level flow diagrams depicting a method of navigation in accordance with an embodiment of the present invention.
Figure 6:
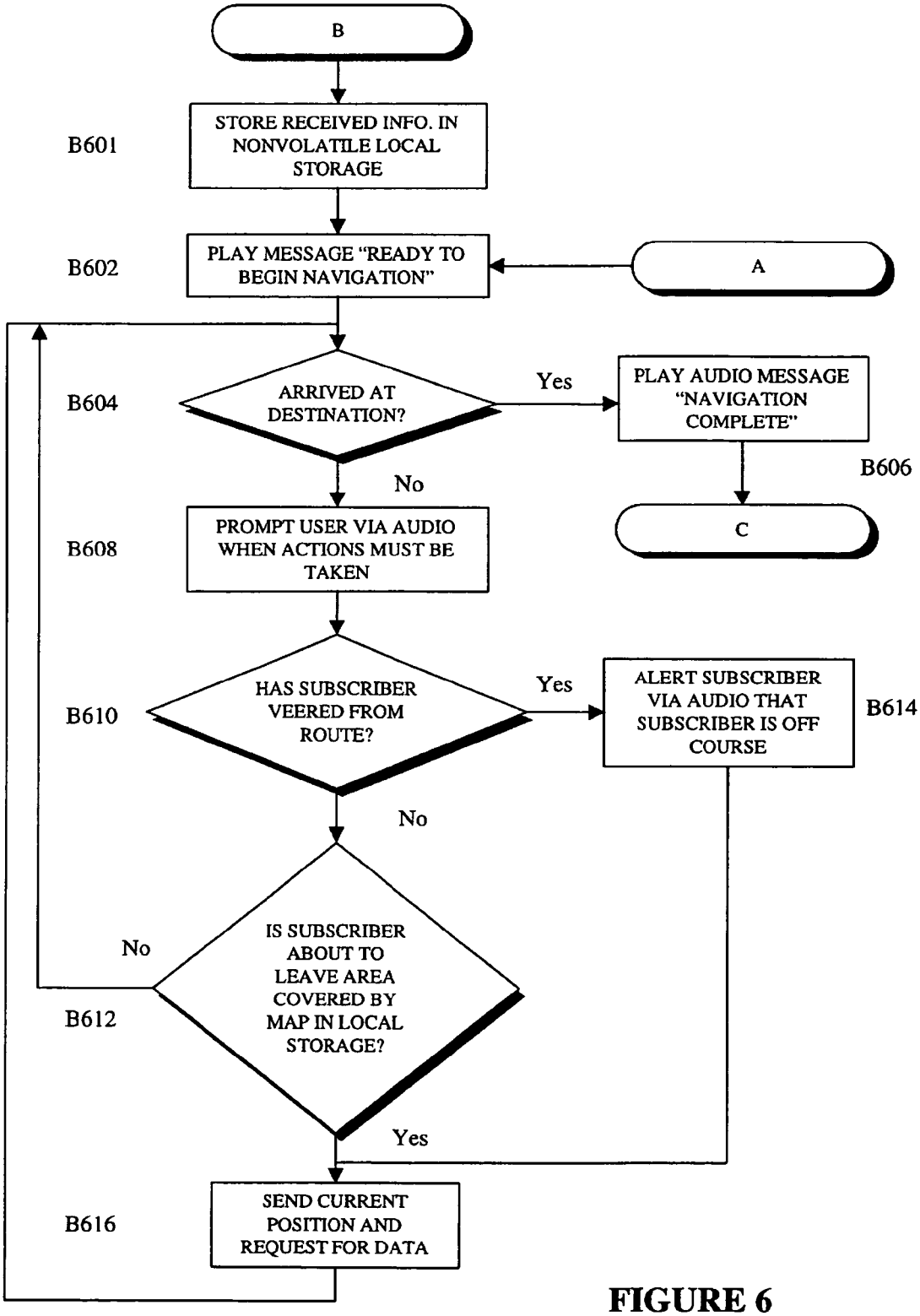

FIGS. 5, 6 are high-level flow diagrams depicting navigation process 500 in accordance with an embodiment of the present invention. As shown in FIG. 5, power is applied to subscriber unit 35 and communication is established between subscriber unit 35 and service provider 31 in block B501. In block B502, subscriber unit 35 acquires its current position via GPS mechanism 42. Subscriber unit 35 then plays an audio prompt for the subscriber to specify a desired destination. The subscriber's speech input is received, and a speech recognition algorithm is performed. If the input is not understood, subscriber unit 35 plays an audio message that the input was not understood in block B512, and once again prompts the subscriber to enter a desired destination.

If the input is understood, then in block B514, central processing and data storage unit 76 determines whether map information encompassing the desired destination is stored locally. If such information is stored locally, subscriber unit 35, in block B516, transmits its current location to service provider 31, which then gathers and transmits routing information to route the subscriber from a current position to the desired destination. If such information is not in local storage, subscriber unit 35, in block B518, transmits the inputted desired destination and current position to service provider 31, which determines whether the destination is a valid destination. If the destination is invalid, subscriber unit 35 plays an audio message that the destination is invalid in block B522, and prompts the subscriber to enter a desired destination. If the destination is valid, subscriber unit 35 receives initial map and routing data from service provider 31, and in block B601 of FIG. 6, stores the received information in nonvolatile local storage.

In block B602, subscriber unit 35 plays a message stating that navigation is ready to begin. In decision block B604, subscriber unit 35 monitors whether the subscriber has arrived at the inputted destination, and, if so, plays an audio message announcing that. navigation is complete. If the inputted destination has not been reached, subscriber unit 35, in block B608, plays audio queues which prompt the user to take action at various waypoints along the route. In block B610, position difference correlator 75 detects whether the subscriber has diverged from the prescribed route. If not, subscriber unit 35 proceeds to block B612. If so, subscriber unit 35, in block B614, plays an audio prompt to alert the subscriber that the subscriber is off course. In block B616, subscriber unit 35 transmits its current position and a request for data to service provider 31, which transmits new map and routing data to subscriber unit 35, which loops back to block B604.

In block B612, position difference correlator 75 detects whether the subscriber is about to leave the geographical area covered by the map in local storage. If not, subscriber unit 35 proceeds to block B604. If the subscriber is about to leave that area, then additional graphical and routing data is needed from service provider 31, and in block B616, subscriber unit 35 transmits its current position and a request for data. Service provider 31 transmits new map and routing data to subscriber unit 35, which loops back to block B604. During navigation in FIGS. 5, 6, service provider 31 may preemptively notify the subscriber and alter a prescribed route (not shown) if the subscriber is approaching adverse traffic or weather conditions and may transmit such routing data to the subscriber.

The foregoing description of the preferred embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machinereadable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed:

1. A navigation [system] *device* comprising:

a subscriber unit configured to receive *information from* and transmit information *to the Internet via a service provider*, the subscriber unit including a global positioning system mechanism to determine subscriber position information, an output mechanism to convey information to a subscriber, and a speech processing mechanism to accommodate communications between the subscriber unit and the subscriber;

[and a service provider configured to communicate with the subscriber unit, the communications between the service provider and the subscriber unit including the reception and transmission of navigation information including map information, wherein] the output mechanism [prompts] *to prompt* the subscriber to speak destination information, the speech processing mechanism [receives] *to receive* the destination information, and the subscriber unit [transmits] *to transmit* the subscriber position information and the destination information to the service provider, [and the service provider responds by transmitting the] *and receive from the service provider* navigation information [to] *including map information,* the subscriber unit[, which conveys] *to convey* the navigation information to the subscriber via the output mechanism, wherein the navigation information involves a plurality of points along a route from a current position to a destination, and wherein the subscriber unit is configured to determine a distance between a current position and a position related to one or more points along the route, and wherein the subscriber unit [requests] *is to request* new map information [from the service provider] when the distance exceeds a predetermined distance.

2. The navigation [system] *device* according to claim 1, wherein the speech processing mechanism includes a speech processing input mechanism to receive requests spoken by the subscriber.

3. The navigation [system] *device* according to claim 2, wherein the speech processing input mechanism is trained to recognize the subscriber's requests with an accuracy exceeding an accuracy obtainable without training.

4. The navigation [system] *device* according to claim 1, wherein the output mechanism includes a speech processing output mechanism configured to output messages by synthetically generating recognizable speech patterns.

5. The navigation [system] *device* according to claim 1, wherein the output mechanism is configured to convey graphical map information to the subscriber, and to overlay a current position on the graphically-conveyed map information.

6. The navigation [system] *device* according to claim 1, wherein the subscriber unit is configured to notify the subscriber that the route has been deviated from when the distance exceeds a predetermined distance.

[7. The navigation system according to claim 1, wherein the information includes information from the Internet.]

8. The navigation [system] *device* according to claim 1, wherein the subscriber unit stores a finite set of map information, and [wherein the service provider transmits] *is to receive* new navigation information *from the server provider* before the subscriber unit leaves a geographic area represented by the finite set of map information.

9. The navigation [system] *device* according to claim 1, wherein the subscriber unit is configured to be mounted on a personal transportation vehicle.

10. A navigation [system] *device* comprising:

a subscriber unit configured to receive and transmit information, the subscriber unit including a global positioning system mechanism to determine subscriber position information, an output mechanism to convey information to a subscriber, and a speech processing mechanism to accommodate communications between the subscriber unit and the subscriber;

[and a service provider configured to communicate with the subscriber unit, the communications between the service provider and ] the subscriber unit [including the reception and transmission of] *to receive* navigation information including map information *from a server provider*, wherein the output mechanism [prompts] *is to prompt* the subscriber to speak destination information, the speech processing mechanism [receives] *to receive* the destination information, and the subscriber unit [transmits] *to transmit* the subscriber position information and the destination information to [the] *a* service provider, and [the service provider responds by transmitting the] *receive* navigation information [to the subscriber unit, which conveys] *including map information from the service provider and convey* the navigation information to the subscriber via the output mechanism, wherein each of the subscriber unit and the service provider encrypt information before transmitting the information, and wherein each user of the subscriber unit is assigned an encryption key, the speech processing mechanism is configured to identify a user on the basis of the voice of the user, and the subscriber unit is configured to use the encryption key assigned to the identified user during navigation by the identified user.

[11. A navigation system comprising:

a subscriber unit configured to receive and transmit information, the subscriber unit including a global positioning system mechanism to determine subscriber position information, an output mechanism to convey information to a subscriber, and a speech processing mechanism to accommodate communications between the subscriber unit and the subscriber; and a service provider configured to communicate with the subscriber unit, the communications between the service provider and the subscriber unit including the reception and transmission of navigation information including map information, wherein the output mechanism prompts the subscriber to speak destination information, the speech processing mechanism receives the destination information and the subscriber unit transmits the subscriber position information and the destination information to the service provider, and the service provider responds by transmitting the navigation information to the subscriber unit, which conveys the navigation information to the subscriber via the output mechanism, and wherein the service provider is configured to store the subscriber position information, the subscriber unit is configured to measure the distance between the stored subscriber position information and a current position, and the subscriber unit transmits the current position to the service provider when the distance exceeds a predetermined distance.]

12. A navigation [system] *device* comprising:

a subscriber unit configured to receive and transmit information, the subscriber unit including a global positioning system mechanism to determine subscriber position information, an output mechanism to convey information to a subscriber, and a speech processing mechanism to accommodate communications between the subscriber unit and the subscriber;

[and a service provider configured to communicate with the subscriber unit, the communications between the service provider and] the subscriber unit [including the reception and transmission of] *to receive* navigation information including map information *from a service provider*, wherein the output mechanism [prompts] *is to prompt* the subscriber to speak destination information, the speech processing mechanism [receives] *to receive* the destination information, and the subscriber unit [transmits] *to transmit* the subscriber position information and the destination information to the service provider, and [the service provider responds by transmitting the] *receive* navigation information [to the subscriber unit, which conveys] *from the service provider and convey* the navigation information to the subscriber via the output mechanism, and wherein the subscriber unit includes a firmware and a software portion, the subscriber unit being configured to receive encrypted firmware and software upgrades, the upgrades being decrypted by, and programmed into, the subscriber unit.

13. A navigation method comprising:

receiving, by a subscriber unit, position information and destination information, the destination information being spoken by a subscriber;

transmitting, by the subscriber unit, the position information and the destination information to a service provider, *after encrypting the information*;

receiving, by the subscriber unit, *encrypted* navigation information from the service provider, the navigation information involving a plurality of points along a route from a current position to a destination;

conveying, by the subscriber unit, the navigation information to the subscriber;

[encrypting, by each of the subscriber unit and the service provider, information before transmission;]

assigning, by the subscriber unit, a first user of [a] *the* subscriber unit an encryption key;

associating the encryption key of the first user with the voice of the first user;

identifying the first user when the first user speaks; and using the encryption key assigned to the first user during navigation by the first user.

14. The navigation method according to claim 13, wherein the [subscriber unit conveys] *conveying comprises conveying* navigation information by synthetically generating recognizable speech patterns.

15. The navigation method according to claim 13, further comprising:

determining, by the subscriber unit or the service provider, the distance between the current position and a position related to one or more points along the route; and notifying the subscriber that the route has been deviated from when the distance exceeds a predetermined distance.

16. A navigation method comprising:

receiving, by a subscriber unit, position information and destination information, the destination information being spoken by a subscriber;

transmitting, by the subscriber unit, the position information and the destination information to a service provider, *after encrypting the information*;

receiving, by the subscriber unit, *encrypted* navigation information from the service provider, the navigation information involving a plurality of points along a route from a current position to a destination;

conveying, by the subscriber unit, the navigation information to the subscriber;

[encrypting, by each of the subscriber unit and the service provider, information before transmission;] and receiving, by the subscriber unit, encrypted firmware or software upgrades.

17. A navigation method comprising:

receiving, by a subscriber unit, position information and destination information, the destination information being spoken by a subscriber;

transmitting, by the subscriber unit, the position information and the destination information to a service provider;

receiving, by the subscriber unit, navigation information from the service provider, the navigation information involving a plurality of points along a route from a current position to a destination;

conveying, by the subscriber unit, the navigation information to the subscriber *by synthetically generating a recognizable speech pattern*;

determining, by the subscriber unit, the distance between the current position and a position related to one or more points along the route; and requesting new map information from the service provider when the distance exceeds a predetermined distance.

[18. A navigation method comprising:

receiving, by a subscriber unit, position information and destination information, the destination information being spoken by a subscriber;

transmitting, by the subscriber unit, the position information and the destination information to a service provider;

receiving, by the subscriber unit, navigation information from the service provider, the navigation information involving a plurality of points along a route from a current position to a destination;

conveying, by the subscriber unit, the navigation information to the subscriber;

storing, by the service provider, the position information;

measuring, by the subscriber unit, the distance between the stored position information and the current position; and transmitting, by the subscriber unit, the current position to the service provider when the distance exceeds a predetermined distance.]

19. A computer-readable medium encoded with a plurality of processor-executable instruction sequences for:

receiving, by a subscriber unit, position information and destination information, the destination information being spoken by a subscriber;

transmitting, by the subscriber unit, the position information and the destination information to a service provider;

receiving, by the subscriber unit, navigation information from the service provider, the navigation information involving a plurality of points along a route from a current position to a destination;

conveying, by the subscriber unit, the navigation information to the subscriber;

determining, by the subscriber unit, the distance between the current position and a position related to one or more points along the route; [and]

requesting new map information from the service provider when the distance exceeds a predetermined distance*; and*

*notifying the subscriber that the route has been deviated from when the distance exceeds a predetermined distance*.

[20. The computer-readable medium of claim 19, wherein the subscriber unit conveys navigation information by synthetically generating recognizable speech patterns.]

[21. The computer-readable medium of claim 19, further comprising processor-executable instruction sequences for:

determining, by the subscriber unit or the service provider, the distance between the current position and a position related to one or more points along the route; and notifying the subscriber that the route has been deviated from when the distance exceeds a predetermined distance.]

22. A computer-readable medium encoded with a plurality of processor-executable instruction sequences for:

receiving, by a subscriber unit, position information and destination information, the destination information being spoken by a subscriber;

transmitting, by the subscriber unit, the position information and the destination information to a service provider*, after encrypting the information*;

receiving, by the subscriber unit, *encrypted* navigation information from the service provider, the navigation information involving a plurality of points along a route from a current position to a destination;

conveying, by the subscriber unit, the navigation information to the subscriber;

[encrypting, by each of the subscriber unit and the service provider, information before transmission;]

assigning, by the subscriber unit, a first user of [a] *the* subscriber unit an encryption key;

associating the encryption key of the first user with the voice of the first user;

identifying the first user when the first user speaks; and using the encryption key assigned to the first user during navigation by the first user.

[23. A computable-readable medium encoded with a plurality of processor-executable instruction sequences for:

receiving, by a subscriber unit, position information and destination information, the destination information being spoken by a subscriber;

transmitting, by the subscriber unit, the position information and the destination information to a service provider;

receiving, by the subscriber unit, navigation information from the service provider, the navigation information involving a plurality of points along a route from a current position to a destination;

conveying, by the subscriber unit, the navigation information to the subscriber;

storing, by the service provider, the position information;

measuring, by the subscriber unit, the distance between the stored position information and the current position; and transmitting, by the subscriber unit, the current position to the service provider when the distance exceeds a predetermined distance.]

* * * * *